United States Patent [19]

Linnstaedter

[11] Patent Number: 4,552,521
[45] Date of Patent: Nov. 12, 1985

[54] APPARATUS FOR CO-EXTRUDING A RUBBER STRIP OF ONE MATERIAL WITH A STRIPE OF A SECOND MATERIAL

[75] Inventor: Don J. Linnstaedter, Waco, Tex.
[73] Assignee: GenCorp Inc., Akron, Ohio
[21] Appl. No.: 679,669
[22] Filed: Dec. 10, 1984
[51] Int. Cl.[4] ................... B29C 47/06; B29C 47/12
[52] U.S. Cl. .......................... 425/131.1; 425/462
[58] Field of Search ............... 425/131.1, 462; 264/171, 245

[56] References Cited

U.S. PATENT DOCUMENTS

| | | | |
|---|---|---|---|
| 1,603,812 | 10/1926 | Stein | 425/131.1 |
| 2,096,362 | 10/1937 | Lehman | 425/131.1 |
| 2,138,378 | 11/1938 | Johnson | 425/131.1 |
| 2,382,177 | 8/1945 | Schanz | 425/131.1 |
| 2,404,630 | 7/1946 | Griffiths | 425/131.1 |
| 2,569,373 | 9/1951 | Fay | 425/131.1 |
| 2,807,833 | 10/1951 | Schanz | 425/131.1 |
| 3,034,941 | 5/1962 | Hessenthaler et al. | 264/167 |
| 3,099,859 | 8/1963 | Eilersen | 425/131.1 |
| 3,280,427 | 10/1966 | Smith | 425/190 |
| 3,464,087 | 9/1969 | Koch | 425/131 |
| 3,486,195 | 12/1969 | Greenwood et al. | 425/131.1 |
| 3,715,420 | 2/1973 | Kiyono et al. | 264/171 |
| 3,799,718 | 3/1974 | Kiyono et al. | 425/131.1 |
| 3,849,045 | 11/1974 | Ohkawa et al. | 425/131.1 |
| 3,864,069 | 2/1975 | Takiura et al. | 425/131.1 |
| 3,959,432 | 5/1976 | Wiley | 425/133.5 |
| 4,128,386 | 12/1978 | Wissinger et al. | 425/131.1 |
| 4,134,952 | 1/1979 | Yoshikawa et al. | 425/133.5 |
| 4,187,270 | 2/1980 | Bartrum | 264/171 |
| 4,443,397 | 4/1984 | Hahn et al. | 425/462 |

Primary Examiner—Willard E. Hoag

[57] ABSTRACT

The extrusion of a tire sidewall or tread and sidewall strip with a white sidewall stripe integrally formed therewith is made possible by an improved, modified preform unit for extrasion die. The preform unit has a first passageway for the sidewall or tread-sidewall strip that extends from the entrance side through to the exit side of the unit. The unit is modified to include a second passageway for the white sidewall material that introduces the white material into the stream of the black sidewall material as it passes through the unit. Upstream of the point where the white side material is introduced, the blockage means interrupts the flow of the black material, creating a void in the stream into which the white material can flow.

3 Claims, 11 Drawing Figures

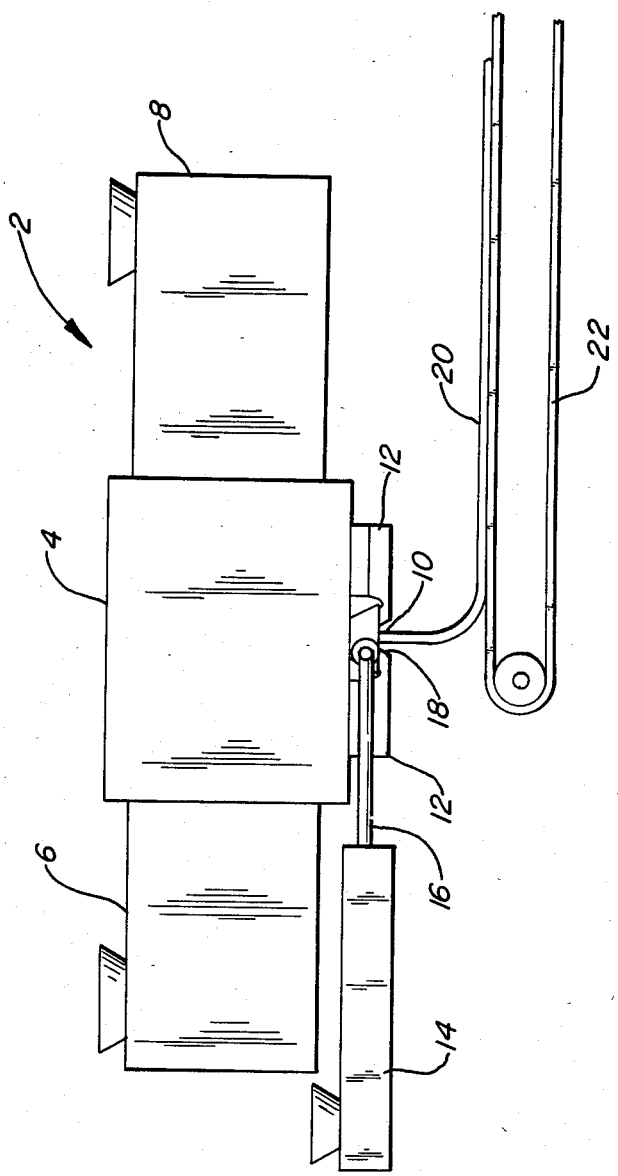

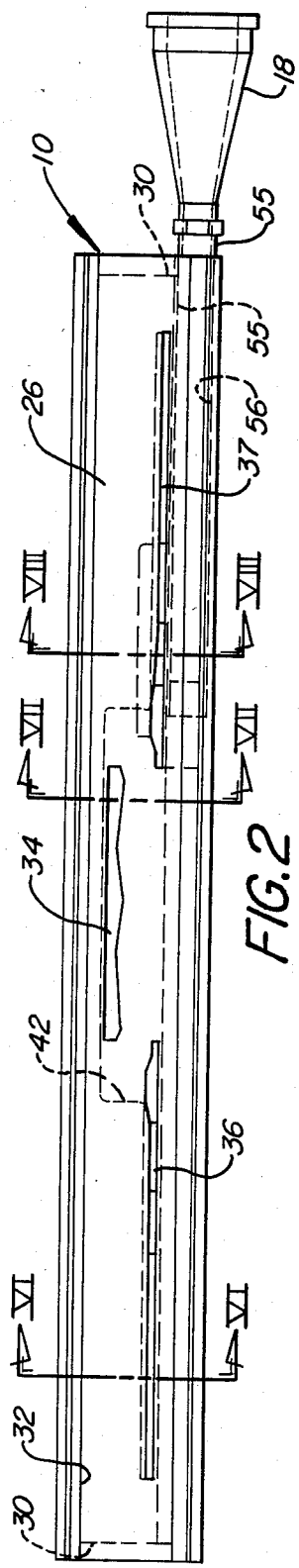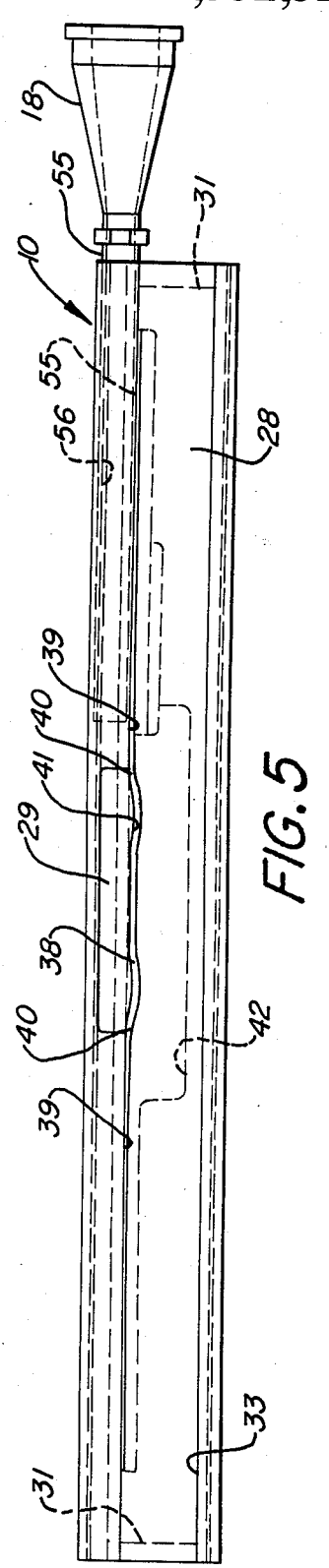

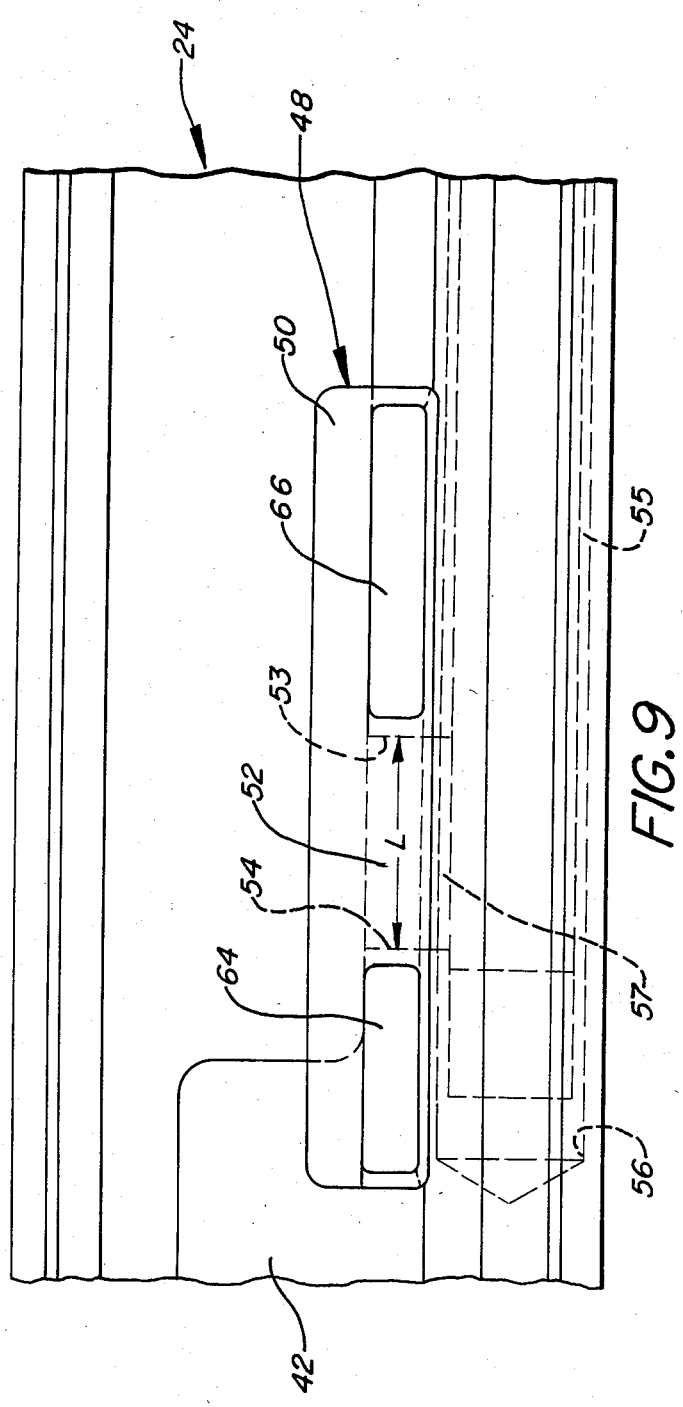
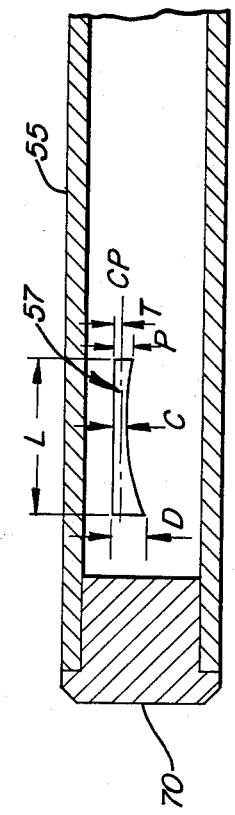
FIG. 9
FIG. 10

APPARATUS FOR CO-EXTRUDING A RUBBER STRIP OF ONE MATERIAL WITH A STRIPE OF A SECOND MATERIAL

FIELD OF THE INVENTION

This invention relates to an extrusion apparatus and method, and more particularly to the kind of extrusion apparatus and method used in forming sidewall strips or combination tread-sidewall strips in the making of vehicle tires.

BACKGROUND OF THE INVENTION

Many vehicle tires, particularly automobile tires, carry an annular white stripe on their sidewall for aesthetic purposes. These white stripes are usually put on the tire as part of a separate strip that is extruded independently of the tread and sidewall components, and then laid over the appropriate sidewall when the assembled tire band is on the building drum. The white sidewall strip then becomes bonded to the main, black portion of the sidewall when the tire is cured in the mold. In this process, great care must be taken to apply the white sidewall strip uniformly around the tire and at the same time, press or "stitch" the strip firmly in place so that a good bonding occurs in the mold. Otherwise, the white sidewall on the finished tire might have a wavy appearance or eventually separate from the tire. The separate extruding operation and the care required in applying the white sidewall strip adds significantly to the cost of making the tire.

In spite of these difficulties, the option of co-extruding the white sidewall stripe integrally with the main body of the sidewall has generally not been considered feasible, because the sidewalls of automobile tires are usually co-extruded with the tread portions in a head that is already very complicated. The rubber used for the tread portion has a formulation that is different from the black rubber of the sidewall portion, and these portions usually flow through separate, intricate, carefully machined passages in the head, and they do not come together until reaching a final "preform" unit that has at its exit end a final die plate. Thus, it would appear to be very difficult and expensive to modify such a mixing apparatus so that a third rubber portion of a different color could be introduced at some point to form a uniform stripe in the middle of one of the sidewalls.

There have been die heads for forming three component strips used in the manufacture of white sidewall tires, for example the one shown in U.S. Pat. No. 2,569,373 to Fay. However, such extrusion apparatus was developed in the days when the white sidewall portion of the tire consisted of nearly the entire sidewall on one side of the tire. Thus, the white sidewall was not a stripe surrounded on either side by a black sidewall; the white portion of the sidewall was essentially tacked onto one side of the tread-sidewall unit. This enabled the white sidewall portion to be extruded through a passageway in the head that was in side-by-side relationship to the black sidewall passageway, with the single interface between the white and black sidewall portions being controlled by a tapered block between the two passageways (block 31 of U.S. Pat. No. 2,569,373).

U.S. Pat. No. 3,280,427 to Smith shows a two-component extrusion apparatus for making the kind of white sidewall strip that is formed separately and is applied later on the building drum to the top of the black sidewall. The center of such a strip is made of white rubber, with a thin layer of black rubber overlaying the white. The thin black layer connects the two black portions on the lateral sides of the white rubber. After the tire is formed and cured, the central portion of the thin black layer is buffed off to expose the white, and the width of the white sidewall strip on the finished tire is controlled by the width of the buffing wheel. The extrusion head shown in U.S. Pat. No. 3,280,427 for making this white sidewall strip is fairly typical of two component extruders and in fact is similar to, but on a smaller scale than, the two-component extruders that are used to make the tread and sidewall strips for tires.

U.S. Pat. Nos. 2,138,378 to Johnson, 3,715,420 to Kiyono, and 4,187,270 to Bartrum show apparatus extruding rubber or plastic products with one or more stripes. In these patents, the stripe material is forced into the main body of the extrudate, and the width of the strip is dependent on the varying pressure differential between the stream of strip material and the stream of main body material, which can result in an uneven stripe width. Likewise, the roll-applied beads applied to the wrapping material of U.S. Pat. No. 3,034,941 to Hessenthaler et al are subject to variations in pressures created by variations in wrapping material thickness and surges in the extruder that extrudes the bead material.

U.S. Pat. No. 3,959,432 to Wiley discloses an apparatus for forming a plastic laminated sheet in which a thin top layer of the laminate is maintained at a controlled thickness by a separator plate (numbered 34 in FIGS. 2, 3 and 4). However, this patent shows only the formation of a two-component sheet that has a base layer coated over its entire surface by a veneer material.

SUMMARY OF THE INVENTION

The present invention simplifies the manufacture of white sidewall tires by providing an apparatus and method whereby a white sidewall stripe can be extruded as an integral part of the main body of the sidewall or tread-sidewall combination. By means of this apparatus and method, a white sidewall material is injected into the middle of the stream of material forming the black portion of the sidewall, so that a white stripe of a uniform width is formed in the sidewall, without the need for an additional strip application on the building drum.

The invention resides in a modified preform unit that has a first passageway for the sidewall or tread-sidewall strip that extends from the entrance side through to the exit side of the unit. This unit is modified to include a second passageway for the white sidewall material that introduces the white material into the stream of the black sidewall material as it passes through the unit. Upstream of the point where the white sidewall material is introduced, a blockage means interrupts the flow of the black material, creating a void in the stream so that the white material can flow into this void without having to push the black material aside.

The invention also resides in a method of extruding a strip having a main body of a first material and lengthwise strip of a second material, that includes the steps of blocking the flow of the first material in a first passageway at a location upstream of the location where a second material is forced into the first passageway, and diverting the first material around both sides of the location where the second material is forced into the first passageway.

These and other objects and characteristics of the invention will be more apparent from the following detailed description and the attached drawings .

DESCRIPTION OF DRAWINGS

FIG. 1 is a diagramatic side view of an extrusion apparatus for making a tread-sidewall strip with a white sidewall stripe in one of the sidewalls, illustrating the general layout of one embodiment of the invention;

FIG. 2 is a top view of the preform unit and white sidewall tube connector of the apparatus shown in FIG. 1, illustrating one embodiment of the invention;

FIG. 3 is a side view of the preform unit of FIG. 2;

FIG. 4 is a right-hand end view of the preform unit of FIGS. 2 and 3;

FIG. 5 is a bottom view of the preform unit and white sidewall tube connector of FIG. 2;

FIG. 9 is an enlarged top view of a portion of the main body of the preform unit of FIGS. 2 through 5, with its introduction die plate removed;

FIG. 10 is a partial longitudinal section of the tube for conveying white sidewall material through the preform unit of FIGS. 2 through 9;

DETAILED DESCRIPTION OF THE INVENTION

Figure 6:
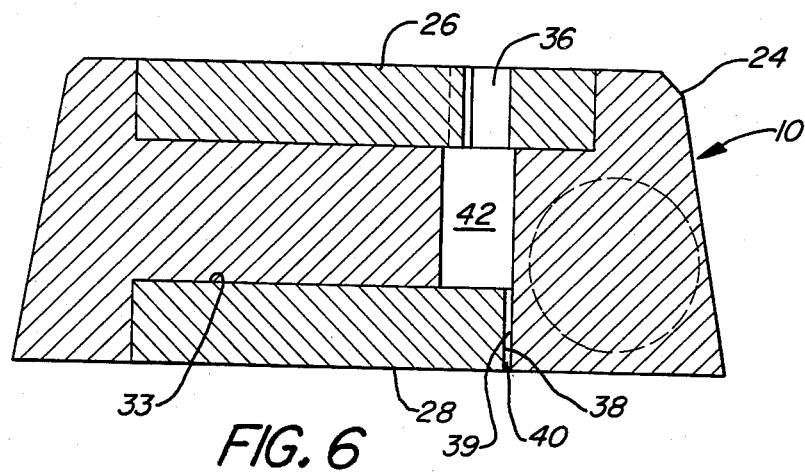
FIGS. 6, 7, and 8 are enlarged cross-sectional views of the preform unit of FIGS. 2 through 5, taken along lines VI—VI, VII—VII, and VIII—VIII, respectively, of FIG. 2.

In the diagramatic FIG. 1, an extrusion apparatus 2, made entirely of steel parts, includes a head 4 in which tread rubber driven by a screw in housing 6 and sidewall rubber driven by a screw in housing 8 come together in proper proportion and alignment to form one tread or "cap" portion and two sidewall portions. These portions are brought together in a preform unit 10, held in place by clamps 12, where, according to the invention, a white sidewall stripe is formed in one sidewall side of the unit. Material for this white stripe is fed by a screw in housing 14 through a tube 16 and connector 18 into a longitudinal passage in the preform unit 10. The finally formed tread-sidewall extrusion 20 with its white sidewall stripe emerges from the bottom of the preform unit 10 and is conveyed away on conveyor 22.

The details of the preform unit 10 are shown in the top, side, end and bottom views, respectively of FIGS. 2, 3, 4 and 5. As best seen in the end view of FIG. 4, the unit 10 includes a main body 24, an introduction die plate 26 and a main profile die plate 28. As shown in FIG. 5, there is also a lower profile die plate 29 that is fastened by screws to the main body 24 and is placed adjacent to the central portion of die plate 28. Recesses 30 underneath the ends of the introduction plate 26 and recesses 31 above the ends of the profile plate 28 allow these plates to be grasped when removing the plates from their respective slots 32 and 33 in main body 24. When the preform unit 10 is in use, the plates 26, and 28 are held in position in their slots in the main body 24 by the holding action of the clamps 12 that secure the entire preform unit 10 to the underneath side of the head 4 (FIG. 1).

The openings in the introduction plate 26 are shown in the top view of FIG. 2. They include a cap opening 34 that receives the cap extrudate from the head 4, a left-hand sidewall opening 36 and a right-hand sidewall opening 37 that receives the sidewall extrudate from the head 4. The bottom view of FIG. 5 shows that the profile die plate 28 has an edge 38 spaced from edge 39 of slot 33 of the main body 24 and from edge 41 of the lower die plate 29. This spacing creates an opening 40 that is designed to give the tread-sidewall extrusion its final shape. Between the introduction plate 26 and the profile plates 28 and 29, the main preform body 24 has a passage 42, shown in dotted lines in FIGS. 2 and 5, and in various cross-sections in FIGS. 6, 7 and 8.

Figure 7:
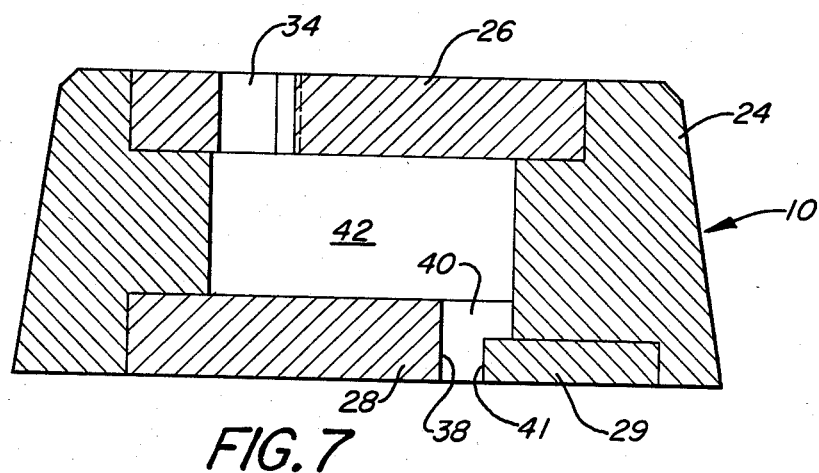
Figure 8:
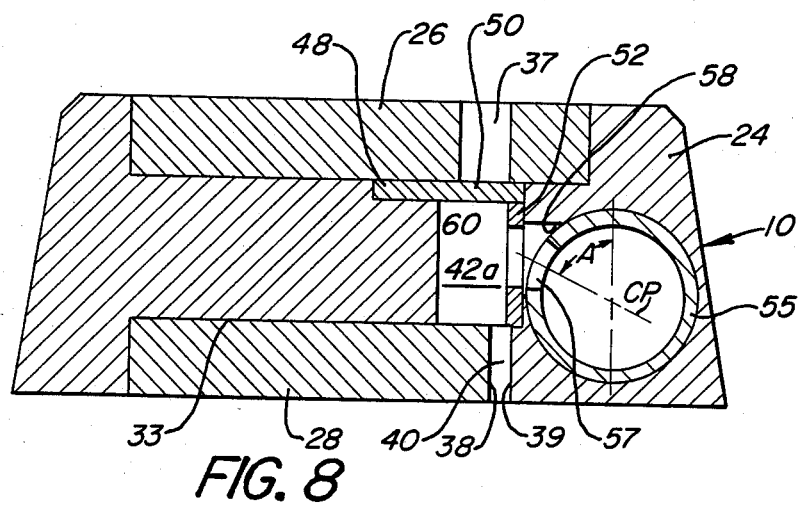

The relationship of the plate openings 34, 36, 37 and 40 to each other and to the passage 42 in the main preform body 24 is best seen in the sectional views of FIGS. 6, 7 and 8. FIG. 6 is a cross-section taken near the lateral edge of the left sidewall portion of the extrusion, and shows the sidewall extrudate opening 36 in the introduction plate 26 leading to a relatively narrow portion of the passage 42 in the main preform body 24. The passage 42 in turn feeds the sidewall material to an extremely narrow portion of the opening 40 between the edge 38 of profile die 28 and the edge 39 of the slot 33 of the main preform body 24.

FIG. 7 is a cross-section taken near the center of the profile preform unit 10 and shows the tread extrudate opening 34 in the introduction plate 26 leading to a relatively wide portion of the preform body passage 42. The extrudate is then fed across the passage 42 into the profile die opening 40, which at this point is bounded by both profile plates 28 and 29.

FIG. 8 is a cross-section taken at the location where the white sidewall extrudate is introduced into a chamber 42a of the preform body passage 42. A steel insert 48 having a top plate 50 and a side plate 51 sits in the passage 42. As shown in the top view of FIG. 9, the plate 50 of the insert 48 has a central portion 52 that blocks the black sidewall extrudate flowing through opening 37 in the introduction plate 26. Two vertical flanges 53 and 54, shown in dotted lines in FIG. 9, are connected between the plates 50 and 52 of the insert 48, and these flanges separate the chamber 42a from the rest of passage 42 in the preform body 24.

A steel tube 55, shown in cross-section in FIG. 8 and in dotted lines in FIGS. 2, 5 and 9, carries the white sidewall extrudate and extends through a drilled hole 56 along one side of the preform body 24, adjacent to the passage 42. As shown in FIGS. 2 and 5, the right end of the tube 55 extends beyond the end of the preform unit 10 and is joined to the connector 18, from which it receives the white extrudate from the extruder screw in housing 14 (FIG. 1). At the inward end of the tube 55, the white extrudate flows through an opening 57 in the tube (FIG. 8), and through a rectangular passage 58 in the main preform body 24 and a rectangular opening 60 in the side plate 51 of the insert 48. The white sidewall extrudate thus fills the chamber 42a and then flows through the opening 40 between the profile plate 28 and the edge 39 of the slot 33 in the preform body 24.

As shown in FIG. 9, the central portion 52 of the top insert plate 50 is flanked by two openings 64 and 66 that allow the black extrudate that has been blocked by the central portion 52 to flow into the portions of the passage 42 on either side of the flanges 53 and 54 that isolate the chamber 42a.

As shown in the longitudinal section of FIG. 10, a plug 70 caps the inward end of the white extrudate tube 55. FIG. 10 also shows the shape of the opening 57 through which the white extrudate passes on its way to the preform chamber 42a. In the preferred embodiment, the center plane CP of the opening 57 is at an angle A (FIG. 8) of 70° to the vertical. This angle has been found to work well for a tube 55 of 0.91 inches (2.31 mm) inside diameter and 1.125 inches (2.858 mm) outside diameter, tapered by turning down to a 1.115 inch (2.832 mm) diameter at the plugged end. The top of the opening 57 is a distance T of 0.125 inches (3.175 mm) from the center plane CP and the bottom right-hand corner of the opening 57 is a distance P of 0.25 inches (6.35 mm) from the top of the opening 57. The bottom of the opening 57 is curved and extends up to a point that is a distance C of 0.18 inches (4.572 mm) from the top of the opening 57, and the bottom edge then extends downward to a point that is a distance D of 0.30 inches (7.62 mm) from the top of the opening 57 on its left end. The length of the opening 57 in the tube 55, the length of the opening 60 in the side plate 52 of blocking unit 48 and the distance between the flanges 53 and 54 should all be the same distance L. The preferred distance L will depend on the width of the white sidewall stripe that is desired, and the thickness of the flanges 53 and 54. The following Table 1 illustrates the distances L recommended for various white sidewall stripe widths, when the flanges 53 and 54 are 0.125 inches (3.175 mm) thick:

TABLE 1

| White Stripe Width | Distance L |
| --- | --- |
| 1.3 inches (3.302 cm) | 1.1 inches (2.794 cm) |
| 1.8 inches (4.572 cm) | 1.6 inches (4.064 cm) |
| 2.3 inches (5.842 cm) | 2.2 inches (5.588 cm) |

The opening 60 in the side plate 52 should also be carefully positioned and sized in width. If the height of plate 52 is 0.875 inches (2.223 cm), the recommended spacing of the bottom of opening 60 from the bottom of the plate is 0.25 inches (6.35 mm) and the recommended width of the opening 60 is 0.325 inches (8.255 mm).

Dimensions such as the length of the tube 55 and the distance of the opening 52 from the center line of the preform unit will of course depend on the size of the tire and the corresponding size of the tread-sidewall extrusion being made. For most passenger car tires the length of the tube 55 will be 14 to 18 inches (36 to 46 cm) and the distance of the opening 57 from the preform unit center line will be between 5.0 and 9.0 inches (12.7 and 22.9 cm).

In the operation of the invention, the black extrudate flows through the cap opening 34 and the sidewall openings 36 and 37 in the introductory plate 26 and then into the passageway 42 of the preform body 24. In the area where the white sidewall stripe is to be formed, the black extrudate is diverted around the chamber 42a formed by the flanges 53 and 54 of the insert 48, and in place of the black extrudate, white extrudate from the tube 55 flows through tube opening 57, preform body passage 58, opening 60 in the insert side plate 52, and into the chamber 42a. In side-by-side relationship, the white extrudate from chamber 42a and the black sidewall extrudate from chamber 42 flow through the opening 40 formed by the profile die 28 and the edge 39 of slot 33 in the preform body 24. Because the white extrudate flows into the stream of the black extrudate through its own chamber that is blocked off by the insert 48, the white stripe in the final product is distinctly separated from the surrounding black material.

Figure 11:
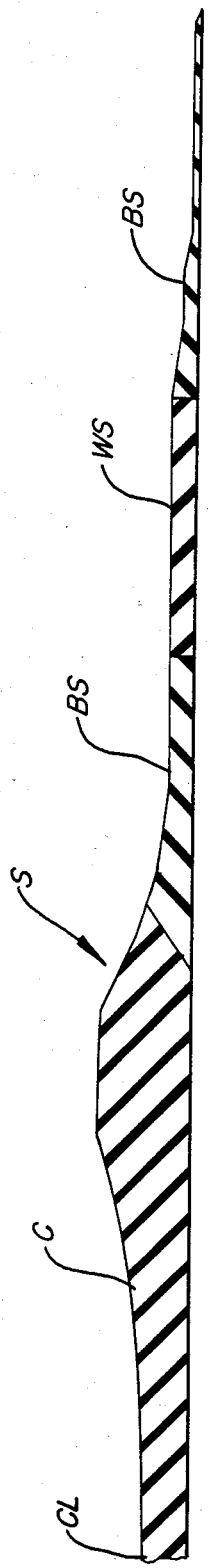
FIG. 11 is an enlarged partial cross-sectional view of the tread-sidewall extrusion with a white sidewall stripe, as the extrusion emerges from the bottom of the preform unit of FIGS. 2 through 9.

A cross-section of the right side of a strip S that is extruded according to the invention is shown in FIG. 11, with the line CL representing the center line of the tread. The strip S includes a cap portion C, a white sidewall stripe portion WS and a black sidewall portion BS located on either side of the white stripe portion WS. The bottom surface of the strip S is flat, because of the swelling that occurs after the strip passes the curved surface of the lower profile die plate 29 (FIG. 5).

While one embodiment of the present invention has been thus shown and described, other embodiments and modifications will of course be apparent, while remaining within the scope of the following claims.

I claim:

1. Apparatus for extruding a strip having a main body of a first material and a lengthwise extending stripe of a second material, said apparatus including a unit with an entry side and an exit side and a first passageway for said first material having a cross-section of relatively wide width and a relatively narrow height, said first passageway extending through said unit from said entry side to said exit side, and a second passageway for said second material intersecting said first passageway at an orifice located on a portion of a widthwise extending edge of said passageway cross-section and between said entry side and exit side of said unit, means on said entry side of said unit for forcing said first material through said first passageway, and means for forcing said second material through said second passageway and into said first passageway through said orifice, characterized by the improvement comprising,
    blocking means interrupting said first passageway at a location upstream from the location where said second passageway interrupts said first passageway, said blocking means extending across the height of said cross-section of said first passageway and over substantially the same widthwise portion of said cross-section as said orifice, but being spaced from the ends of said widthwise extending edge of the cross-section,
    a tube extending from said end surface of said unit through said unit parallel to and spaced from said widthwise edge surface of the elongated cross-section of said first passageway, said tube forming the wall of said entry portion of said passageway and having an elongated hole at the location where said exit portion intersects said entry portion of said second passageway, said elongated hole extending parallel to and facing said widthwise edge of the cross-section of said first passageway.

2. Apparatus according to claim 1, characterized further by the improvement comprising said unit having an entry portion of said second passageway extending substantially parallel to and spaced from said widthwise edge of said cross-section of said first passageway, said entry portion of said second passageway beginning at an opening in an end surface of said unit located between the entry side and the exit side of the unit, said unit having the exit portion of said second passageway extending from said entry portion to the orifice located in said widthwise edge of the first passageway, and
    said means for forcing said second material through said second passageway being connected to said entry portion at said opening in the end surface of the unit.

3. Apparatus according to claim 1 characterized also by said strip being, at least in part, a rubber sidewall strip for a tire, said first material being black pigmented rubber, said second material being white pigmented rubber, said unit having an introduction die plate mounted on the entrance side of the unit and a profile die plate mounted on the exit side of the unit, said introduction die plate and profile die plate having openings each forming the entrance and exit ends, respectively, of said first passageway through said unit, and said blocking means being located in said opening in said introduction die plate.

* * * * *